March 10, 1925.                                                                            1,528,894
E. E. SCHMID ET AL
SPLICE CLAMP
Filed July 26, 1924
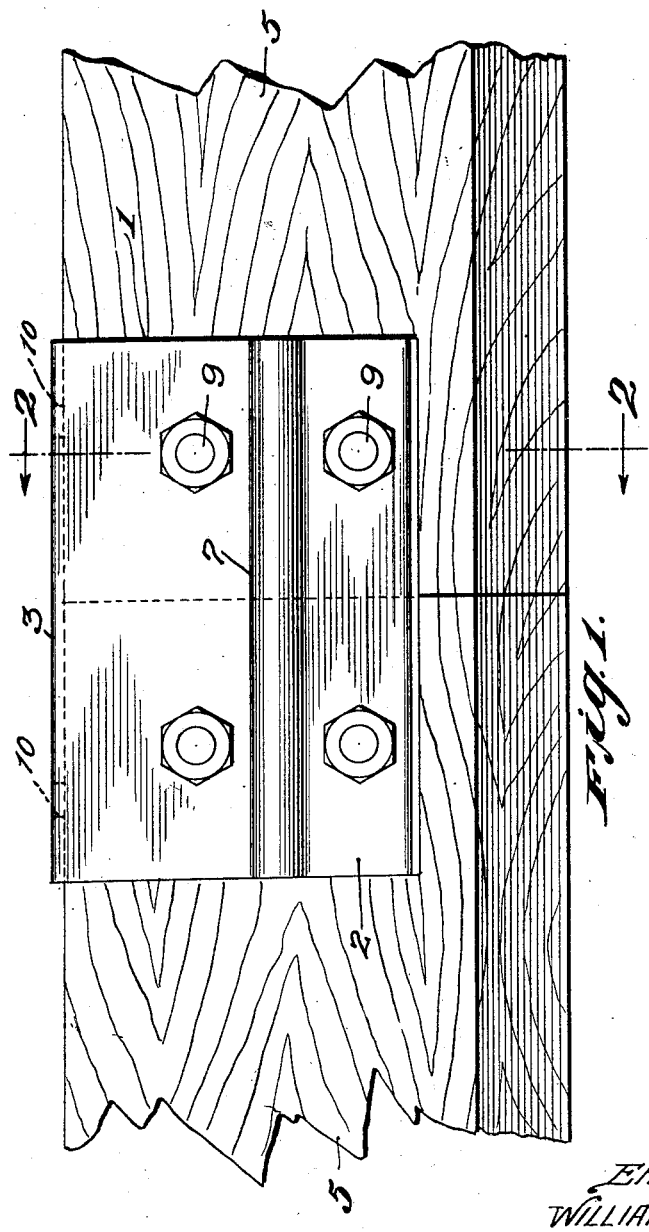
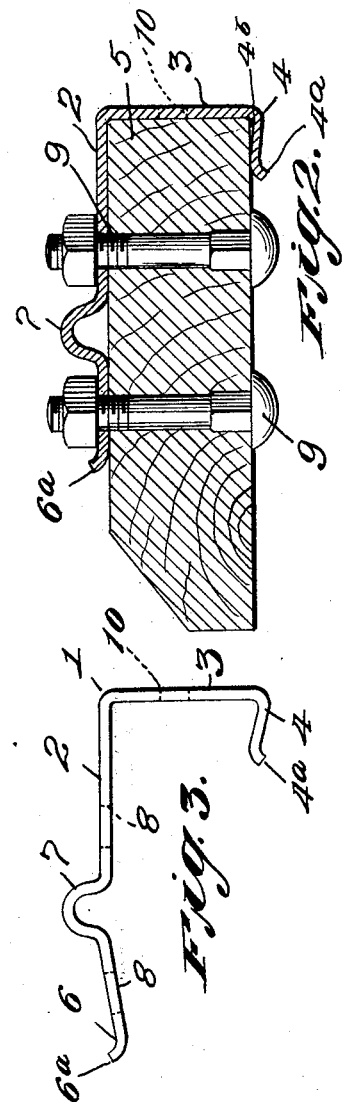
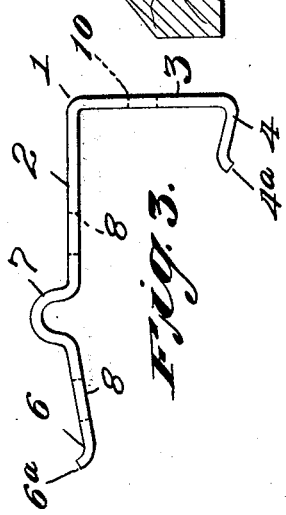
INVENTORS
ERNEST E. SCHMID &
WILLIAM H. SCHNEIDER
BY
William P. Hammond
ATTORNEY Patented Mar. 10, 1925.

1,528,894

UNITED STATES PATENT OFFICE.

ERNEST E. SCHMID, OF HOLLIS, AND WILLIAM H. SCHNEIDER, OF FREEPORT, NEW YORK.

SPLICE CLAMP.

Application filed July 26, 1924. Serial No. 728,510.

*To all whom it may concern:*

Be it known that we, ERNEST E. SCHMID, a citizen of the United States, residing in Hollis, county of Queens, and State of New York, and WILLIAM H. SCHNEIDER, residing in Freeport, county of Nassau, and State of New York, have invented new and useful Improvements in Splice Clamps, of which the following is a specification.

This invention relates to an improvement in splice clamps for joining the ends of two abutting members and preserving the alignment of the same.

A particular application of the invention is to the joining of the abutting ends of the third rail protection board on electric railways or the like, however, the clamp is not limited to this particular use but may be used in various places where it is desired to preserve the alignment of two abutting members.

One of the objects of the invention is to provide a splice clamp which will engage both the upper and lower faces of the abutting ends of third rail protection boards or the like so as to preserve the alignment thereof for a limited time even though the bolts or other means by which the clamp is secured to the abutting members may become loosened.

Another object of the invention is to provide a splice clamp having greatly increased longitudinal strength over the flat or angular splice clamps now in use and hence better adapted to preserve the alignment of the members it splices but which can be produced and installed with little additional cost over the cost of producing and installing the present splice clamps.

Another object of the invention is to provide a splice clamp which will grip the upper and lower faces of the abutting members with a spring pressure to assist in retaining the clamp upon the members and in holding the members in alignment.

A further feature of the invention is to provide a splice clamp with a ventilating groove or corrugation which will permit circulation of air between the clamp and the members which it splices thereby reducing capillary attraction and permitting the drying out of the wood, preventing rotting of the same.

Various other objects and advantages will appear as the description of the invention proceeds.

Referring now to the drawing which illustrates a preferred form of the embodiment of the invention.

Figure 1 is a perspective plan view of the splice clamp in a position of use.

Figure 2 is a sectional view on the line 2—2 of Figure 1.

Figure 3 is a side elevation of the clamping member.

The clamp comprises a unitary sheet metal member 1, provided with an upper lapping portion 2, a side member 3 and a lower tongue 4 and is adapted to fit upon the third rail protection boards 5 or other members to be spliced in a position as indicated in Figure 2.

The front part of the lapping portion 2 is preferably bent downward at 6 and the front of the tongue 4 is preferably bent upward to permit a spring like grip on the abutting members between the portions 4 and 6 and the edges of these members are turned outward at $4^a$ and $6^a$ to permit the clamp to be easily slipped upon the members to be spliced. A longitudinal ridge or corrugation 7 is provided in the lapping portion 2 to increase the strength of the clamp and to permit the circulation of air between the lapping portion and the protection boards 5 so as to permit drying of the protection boards and prevent rotting of the ends thereof and the bowed shape of the spring tongue 4 spaces the tongue from the lower edge of the protection boards as indicated at $4^b$ to form an air gap along this portion of the clamp. The holes 8 are provided in the lapping member 2 for receiving the carriage bolts 9 by which the splice clamp is secured to the abutting ends of the protection board and if desired, holes 10 may be provided in the side member 3 for lag screws to rigidly secure the clamp to the edges of the boards.

In the use of the ordinary splice clamps as heretofore provided, which comprise merely a flat or angular piece of metal bridging the abutting ends of the protection board and secured thereto by means of bolts 9 or the like, the bolts in service often work loose due to the people jumping or walking on the boards, due to the vibration of the contact shoes passing over the third rail or due to the passing of the cars along the adjacent track. This looseness often permits the end of one of the protection boards to drop below the other board into the path of the contact shoe so that the contact shoes are broken off in this way even though careful and frequent inspection is made of these splices. The protection boards also tend to warp at the joints and drop away from the ordinary flat or angular splice clamps.

By the use of the present invention, however, due to the increased longitudinal strength of our clamp and the contact with both sides of the boards, our clamp serves to prevent warping and to retain the abutting ends of the protection boards in proper alignment even if the carriage bolts do work loose. The ventilating groove or corrugation 7, materially increases the longitudinal strength of the splice clamp, and at the same time prevents the rotting out of the ends of the protection board so that they give longer service.

It is, of course, obvious that the spring features of the tongue 4 and portion 6 may be dispensed with and a strengthened splice clamp provided, of the general shape illustrated, which merely fits tightly upon the upper and lower faces of the abutting ends of the protection boards, and that the same advantage of preserving the alignment of the protection boards against warping and against loosening of the carriage bolts may be secured thereby.

Such a construction together with any other changes and modifications which fall within the spirit of our invention or the scope of the appended claims are to be considered a part of our invention.

We claim:

1. A splice clamp for joining the abutting ends of protection boards or the like, comprising an upper lapping portion, a lower contact portion and rigid connecting means therebetween.

2. A splice clamp for joining the abutting ends of protection boards or the like comprising an upper lapping portion, a lower contact portion and connecting means therebetween, said upper and lower portions normally positioned closer together than the width of the members which they are to join so as to exert a spring or wedging action upon the abutting ends of the protection boards.

3. A splice clamp of the type described having a portion thereof spaced from the members it splices to permit circulation of air between the clamp and the spliced members.

4. A splice clamp of the type described, comprising a resilient upper lapping member, a resilient lower contact member, means connecting said members and a longitudinal corrugation in said lapping members to strengthen the clamp and to permit circulation of air between said lapping member and the members lapped.

5. In a splice clamp of the type described, a resilient lapping member, a resilient lower contact member, means connecting said members, a strengthening and ventilating ridge in said upper lapping member and upturned edges on the lapping member and the contact member to permit easy application of the splice clamp to the members to be spliced.

6. A three sided L-shaped splice clamp for protection boards or the like, provided with a longitudinal corrugation in the long leg of the L for increasing the strength thereof.

In testimony whereof we have affixed our signatures to this specification.

ERNEST E. SCHMID.
WILLIAM H. SCHNEIDER.